United States Patent Office
3,772,416
Patented Nov. 13, 1973

3,772,416
REHYDRATION AND PRESSURE-SINTERING OF HOT-PRESSED ALUMINA STRUCTURES
Ronald L. Clendenen, Orinda, Calif., assignor to Shell Oil Company, New York, N.Y.
No Drawing. Continuation-in-part of abandoned application Ser. No. 54,608, July 13, 1970. This application Oct. 18, 1971, Ser. No. 190,308
Int. Cl. C04b 35/60
U.S. Cl. 264—332
3 Claims

ABSTRACT OF THE DISCLOSURE

Finely grained aluminous ceramic compositions having densities of at least 95 percent of their theoretical maximum are produced with improved efficiency by a three step hot pressing process of (1) maintaining finely divided alumina precursors and Fourth Period transition metal oxide precursors at elevated temperature and pressure to decompose a major proportion of the precursors to ceramic oxides and form a solid body; (2) adding a controlled amount of water to the resulting body; and (3) heating the aquated product and applying pressure to complete the decomposition and densification.

CROSS REFERENCE TO PRIOR APPLICATION

This is a continuation-in-part of application Ser. No. 54,608, filed July 13, 1970, now abandoned.

BACKGROUND OF THE INVENTION

Field of the invention

This invention relates to a hot pressing process for forming dense aluminous ceramic bodies.

The prior art

Conventional cold forming methods for preparing ceramic bodies, such as extrusion, cold pressing and slip casting produce products which, after thermal treatment (firing), are frequently porous rather than dense. The relative strength, toughness and hardness of a given ceramic composition being proportional to its density, there has been substantial effort directed to methods of forming high density (low porosity) ceramics for applications where physical strength and hardness are of maximum importance such as in cutting tools and the like. Likewise, dense ceramics have been sought because of their increased resistance to corrosion.

A process known as hot pressing, which incorporates forming and thermal treatment in a single step, is known to give relatively dense ceramics. Conventionally, hot pressing is effected by placing finely divided particles of ceramic-forming oxides such as alumina, titania, zirconia, and the like, in a die of graphite, zirconia, etc. and heating the die by induction to a temperature of 1500 to 2000° C. while applying a pressure to the particles. The particles sinter and form a dense ceramic product. The high temperatures and special nondurable high-temperature-resistant dies needed for conventional hot pressing have limited its application. Any modification of the hot pressing process which permits higher densities to be achieved at lower temperatures is important to the practicality of the process.

U.S. 3,379,523 issued Apr. 23, 1968 to Chaklader and applicant's copending U.S. Ser. No. 74,181 disclose two methods for forming dense ceramics by pressing at lower temperatures. Chaklader presses decomposable oxide-yielding materials, such as zirconium hydroxide, at relatively low temperatures, while Ser. No. 74,181 discloses that even better results are achieved by pressing certain mixtures of finely divided ceramic precursors. Both of these processes employ a single hot pressing step to prepare the final ceramic product.

STATEMENT OF THE INVENTION

It has now been found that the efficiency of hot pressing processes for preparing finely grained aluminous ceramic compositions having densities of not less than 95 percent of their theoretical maximum from finely-divided aluminum hydroxide and optionally Fourth Period transition metal hydroxides is improved by carrying out the hot pressing in three steps rather than the single step conventionally employed. In accord with this invention the hot pressing is carried out by (1) exposing three micron or less diameter particles of aluminum hydroxide, optionally intimately mixed with up to 60% by weight of three micron or less diameter particles of a hydroxide of a Fourth Period transition metal to a temperature of from about 400° C. to about 800° C. at a pressure of from about 500 p.s.i. to about 10,000 p.s.i. for a period sufficient to decompose from about 75% to about 98% of the hydroxide to oxide and liberate water; (2) adding water to the resulting oxide product in the amount of from about 10 to about 50 percent by weight of the water liberated in step (1); and (3) exposing the reaquated oxide product to a temperature of from about 700° C. to 1500° C. and a pressure of from about 1000 p.s.i. to about 20,000 p.s.i. to complete the decomposition.

DETAILED DESCRIPTION OF THE INVENTION

Starting materials

Finely grained particles of hydrous ceramic precursors are starting materials in the ceramic-forming process of the invention. Suitable starting materials include aluminum hydroxide and mixtures of aluminum hydroxide and hydroxides of at least one transition metal of Fourth Period of the Perodic Table, that is transition metal of an atomic number from 21 to 3, inclusive. Illustrative of such Fourth Period transition metal hydroxides are scandium hydroxide, titanium hydroxide, vanadium hydroxide, chromic hydroxide, manganese hydroxide, ferric hydroxide, cobalt hydroxide, nickel hydroxide, cupric hydroxide and zinc hydroxide. The starting materials in all cases must have a substantial proportion of aluminum hydroxide, e.g., at least about 40% by weight and preferably at least about 70% by weight based on the total feed material. In a two component feed material, therefore, the Fourth Period transition metal hydroxide will be present in an amount not greater than about 60% by weight. Very suitable two component feed materials contain from about five percent by weight to about 60% by weight and preferably from about 15% by weight to about 30% by weight of a Fourth Period transition metal hydroxide. In some instances, further processing improvements are realized by incorporating a minor proportion of an additional Fourth Period transition metal hydroxide into the feed material. For example when minor proportions, say up to five percent by weight of titanium hydroxide are added the processing temperatures are reduced. When a third component is present, amounts of up to about five percent by weight based on total starting materials are satisfactory.

Preferred starting materials contain from 100% by weight to 40% by weight of an aluminum hydroxide and from zero percent by weight to 60% by weight of one hydroxide reacted from ferric hydroxide, chromic hydroxide, and titanium hydroxide. Most preferred starting materials are aluminum hydroxide, and mixtures of aluminum hydroxide and from 15% by weight to 30% by weight of ferric hydroxide or chromic hydroxide. Suitable aluminum hydroxide starting materials may be precipitated from an aqueous solution of an aluminum salt with a base such as ammonia. Multicomponent starting materials may be prepared either by mixing the individual hydroxides as precipitated from separate aqueous solutions or by coprecipitating a mixture of aluminum hydroxide and Fourth Period transition metal hydroxides.

Regardless of the exact composition of the starting hydroxides, it is essential that these materials be present as fine-grained powder or as larger particles which are themselves aggregates of fine-grained powders. The average grain of the starting hydroxide powders or of the powders aggregated into starting particles should be no more than about three microns in diameter and preferably no more than about one micron in diameter. When multicomponent starting materials are employed it is essential that the several components be admixed intimately, preferably on a submicron level. Such mixtures can be prepared by thoroughly mixing submicron grain size powders of the components or by coprecipitation or infiltration/precipitation techniques.

The forming process

The process of this invention for forming dense ceramic bodies from the hydroxide starting material consists of three steps: a first decompositive hot pressing, a water addition (aquation), and a final hot pressing.

In the first step the fine-grained particles of aluminum hydroxide, optionally intimately mixed with particles of Fourth Period transition metal hydroxides are subjected to controlled elevated temperature and pressure to decompose from 75% by weight to 98% by weight of the metal hydroxides to ceramic oxides. Preferably from 85% by weight to 95% by weight of the hydroxides are decomposed to oxides. During the first hot pressing, the decomposing hydroxides are formed into a solid, but not fully dense, optionally shaped body. Very suitable pressures for the first hot pressing vary from about 500 p.s.i. to about 8000 p.s.i. with pressures in the range of from about 1000 p.s.i. to 5000 p.s.i. being preferred. The optimum pressure employed in this initial pressing will depend upon the specific starting material employed and its decomposition temperature. Temperatures of from about 400° C. to about 1000° C. are generally suitable. When pure aluminum hydroxide is the feed, temperatures of from 400° C. to 1000° C., and preferably from 500° C. to 800° C., are most suitable. When a mixture of aluminum hydroxide and a preferred Fourth Period transition metal hydroxide (ferric hydroxide, chromic hydroxide, or titanium hydroxide) is employed, temperatures of from 400° C. to 800° C., and preferably from 400° C. to 600° C. are most suitable. It is preferred to reach the desired elevated temperature gradually over a period of time. A controlled heating rate of about 500° C. per hour to 6000° C. per hour is satisfactory although higher or lower rates are usually employed on occasion.

The first heating and pressing is continued until a major proportion, but not all, of the hydroxide starting material has decomposed to ceramic oxide and water. Very suitably the first heating and pressing is continued until from about 75% to about 98% of the hydroxide has decomposed, preferably, until from about 80% to about 96% of the hydroxide has decomposed. While the exact times used depend upon the pressures, temperatures, and compositions involved, suitable times are in the range of from 1 to 120 minutes, more suitably, 5 to 60 minutes.

In the second step of the process of this invention water is added to the firm, but not fully dense, body formed in the first step. The amount of water added should be equivalent to at least about five percent of the water driven off in the first hot pressing. Preferably, water is added in amount equivalent to from about ten percent to about 65%, and most preferably from 20% to 55%, of the water driven off in the first hot pressing.

Water may be added in a variety of manners. In one method, the ceramic article is contacted with liquid water and dried under mild conditions to reach the desired water content. In another method, the ceramic articles are contacted with a moist environment (water vapor) for a period sufficient to effect the desired water pickup.

The aquated product of the water addition step is then subjected to a second hot pressing to complete the decomposition of the remaining hydroxide and form a dense ceramic compact while driving off any added water. This pressing is generally effected at conditions more severe than those employed in the first hot pressing. Suitable pressures are from 1000 p.s.i. to 20,000 p.s.i. and preferably from 3000 p.s.i. to 10,000 p.s.i. The temperature is satisfactorily at least about 700° C. and preferably from about 700° C. to about 1500° C. Excellent results are achieved with high alumina materials at temperatures in the range of from 900° C. to 1450° C. As with the first heating, it is of advantage to use a gradual heating. Heating rates and times described for the first hot pressing are suitable for this hot second pressing, that is from about one to about 120 minutes, preferably five to 60 minutes.

Table I lists several exemplary feedstocks and gives the conditions which are very suitable for the two hot pressings with each.

TABLE I

| Starting material | First pressing | | Second pressing | |
|---|---|---|---|---|
| | Temp., ° C. | Pressure, p.s.i. | Temp., ° C. | Pressure p.s.i. |
| Al(OH)₃ | 800 | 4,000 | 1,450 | 6,000 |
| 85% Al(OH)₃/15% Fe(OH)₃ | 600 | 4,000 | 1,250 | 5,000 |
| 50% Al(OH)₃/50% Fe(OH)₃ | 600 | 4,000 | 1,000 | 6,000 |
| 85% Al(OH)₃/15% Cr(OH)₃ | 600 | 4,000 | 1,400 | 4,000 |
| 50% Al(OH)₃/50% Cr(OH)₃ | 600 | 4,000 | 1,300 | 4,000 |
| 80% Al(OH)₃/20% Mn(OH)₂ | 600 | 4,000 | 1,300 | 4,000 |
| 84% Al(OH)₃/14% Fe(OH)₃, 2% Ti(OH)₄ | 600 | 4,000 | 1,150 | 4,000 |

The process of the invention offers several distinct advantages over single step processes. Under equivalent conditions it prepares a more dense product. Its first pressing step is at low enough temperatures that the die employed may be made of conventional materials of construction (stainless steel and the like). Since a major portion of the compaction is effected in the first pressing, its second higher-pressure pressing can employ a short stroke press as opposed to a more expensive long stroke press.

The density of the ceramic compositions prepared by the process of the invention approaches the theoretical maximum. The densities are at least 95% of the theoretical maximum density, more often at least about 97% and on occasion over 99% of the theoretical maximum density, so that little if any observable contraction takes place on return of the ceramic materials to ambient temperature. Thus, ceramic articles can be heat formed by the present process with dimensions quite close to those ultimately desired since they substantially retain these dimensions upon cooling. When multiple component starting materials (for example aluminum hydroxide plus ferric hydroxide) are employed, the ceramic compositions produced are characterized by a high degree of ductility, being deformable without fracture at high strain rates. These ceramic compositions are adaptable for hot rolling into strips, bars, rods and the like and for forging, stamping, deep drawing and the like. After forming these ductile two component ceramic products into a desired shape, their ductility can be removed by maintaining the formed products at higher temperatures (e.g., 80–90% of the melting temperature of the ceramic product) to grow larger size grain in the product and in part high temperature creep resistance to the product.

To further illustrate the improved process of the invention the following examples are provided.

EXAMPLE I

Finely divided aluminum hydroxide was produced by adding aqueous ammonia to an aqueous aluminum nitrate solution. The aluminum hydroxide precipitated was washed thoroughly, filtered, and dried at 50° C. for 48 hours to remove free water and give a product having an average grain size of less than three microns. A 14.1 gram sample of this aluminum hydroxide was then formed into a dense alumina compact by the process of the invention. The aluminum hydroxide was placed in a ¾ inch diameter piston cylinder graphite die. A pressure of 4000 p.s.i. was applied and the hydroxide was heated to 600° C. at a heating rate of 2000° C./hour to decompose the hydroxide. The die pressure was then released and the product was cooled. Examination and analysis of the product showed that the product was relatively strong and that 95% of the hydroxide had decomposed to oxide. The product was then placed in a moist environment for 96 hours at 21° C. Reanalysis showed that the product regained about 25% of the water lost during the decomposition. The aquated product was placed in the die again, a pressure of 4000 p.s.i. was applied and the product was heated to 1500° C. at a rate of 3000° C./hour. The pressure was released and the die was cooled. The final product, a solid aluminous ceramic article, was removed. Examination of the article indicated that it had a density 98% of the theoretical maximum. Analysis of the product indicated that it was made up entirely of alumina particles of an average diameter of two microns.

Comparative Experiment A

The experiment of Example I was repeated with one change. Instead of placing the product in a moist atmosphere after the first pressing in accordance with the invention, the product was placed in a desiccator at 21° C. for an equivalent period of time. Following an identical second pressing, the product was examined and found to have a lower density, 94% of theoretical maximum.

EXAMPLE II

Finely divided 85% weight aluminum hydroxide—15% weight ferric hydroxide mixture was produced by adding aqueous ammonia to an aqueous aluminum nitrate—ferric nitrate solution. The coprecipitated aluminum and iron hydroxides were washed thoroughly, filtered, and dried at 50° C. for 48 hours to remove free water. This product had an average grain size of less than three microns. A 14.2 gram sample of this aluminum hydroxide-iron hydroxide mixture was then formed into a dense alumina-hemitite compact by the process of the invention. The aluminum and iron hydroxides were placed in a ¾ inch diameter piston cylinder graphite die. A pressure of 4000 p.s.i. was applied and the hydroxide was heated to 600° C. at a heating rate of 6000° C./hour and held at temperature for 30 minutes to decompose the hydroxide and liberate water. The die pressure was then released and the product was cooled. Examination and analysis of the product showed that the product was relatively strong and that 91% of the hydroxide had decomposed to oxide. The product was then placed in a moist environment for 96 hours at 21° C. Reanalysis showed that the product regained about 50% of the water lost during the decomposition. The aquated product was placed in the die again, a pressure of 4000 p.s.i. was applied and the product was heated to 1300° C. at a rate of 3000° C./hour and held at temperature for ten minutes. The pressure was released and the die was cooled. The final product, a solid aluminous ceramic article, was removed. Examination of the article indicated that it had a density 99.8% of the theoretical maximum. Analysis of the product indicated that it was made up entirely of alumina particles of an average diameter of 0.4 micron.

Comparative Experiment B

The experiment of Example I was repeated with one change. Instead of placing the product in a moist atmosphere after the first pressing in accordance with the invention, the product was placed in a desiccator at 21° C. for an equivalent period of time. Following an identical second pressing, the product was examined and found to have a lower density, 98.6% of the theoretical maximum.

I claim as my invention:

1. The process of producing a fine-grained, aluminous ceramic composition having a density of not less than 95% of its theoretical maximum by (1) exposing particles of solid hydrous ceramic precursor consisting essentially of less than about three micron diameter particles of aluminum hydroxide intimately mixed with from zero percent by weight to about 60% by weight of less than about three micron diameter particles of a hydroxide of a Fourth Period transition metal to an elevated temperature of from about 400° C. to 800° C. and an elevated pressure of from about 500 p.s.i. to about 8000 p.s.i. for a period in the range of from about one to about 120 minutes sufficient to decompose from 75 to 98% of the hydroxide originally present to oxide and water; (2) adding water to the resulting oxide product in amount equivalent to from ten percent to 65% of the water driven off in step (1); and (3) exposing the resulting aquated oxide product to an elevated temperature of from about 700° C. to about 1500° C. and a pressure of from about 1000 p.s.i. to 20,000 p.s.i. for from about one to about 120 minutes.

2. The process in accordance with claim 1 wherein the Fourth Period transition metal is selected from iron, chromium, and titanium.

3. The process in accordance with claim 1 wherein the solid hydrous ceramic precursor consists essentially of aluminum hydroxide and from 15% by weight to 30% by weight of iron hydroxide.

References Cited

UNITED STATES PATENTS

| | | | |
|---|---|---|---|
| 3,608,060 | 9/1971 | Osment et al. | 106—65 X |
| 3,702,881 | 11/1972 | Chaklader | 264—332 X |
| 3,676,079 | 7/1972 | Morgan | 264—332 X |
| 3,379,523 | 4/1968 | Chaklader | 264—332 |
| 3,223,483 | 12/1965 | Osment | 252—463 X |
| 3,222,129 | 12/1965 | Osment et al. | 23—141 |
| 3,226,191 | 12/1965 | Osment et al. | 23—141 |
| 3,666,851 | 5/1972 | Chaklader | 264—332 X |

OTHER REFERENCES

Kuczynski; Sintering and Related Phenomena, Gordon and Breach, 1967, pp. 861–894.

JOSEPH L. SCHOFER, Primary Examiner

D. A. JACKSON, Assistant Examiner

U.S. Cl. X.R.

106—65; 264—63, 65